United States Patent [19]

Chandler et al.

[11] Patent Number: 4,463,027

[45] Date of Patent: Jul. 31, 1984

[54] METHOD OF FORMING A MEAT CURING BRINE

[75] Inventors: William S. Chandler, St. Clair; Walter F. Wilkens, Marysville; John F. Heiss, St. Clair, all of Mich.

[73] Assignee: Diamond Crystal Salt Company, St. Clair, Mich.

[21] Appl. No.: 559,481

[22] Filed: Jan. 25, 1984

Related U.S. Application Data

[62] Division of Ser. No. 358,629, Mar. 16, 1982, Pat. No. 4,434,187.

[51] Int. Cl.$^3$ ........................... A23B 4/02; A23B 4/14
[52] U.S. Cl. ................................. 426/652; 426/265; 426/266
[58] Field of Search ............... 426/264, 265, 266, 281, 426/332, 532, 641, 652, 662; 252/400.1, 400.2, 400.3, 400.62

[56] References Cited

U.S. PATENT DOCUMENTS

| | | |
|---|---|---|
| 1,696,374 | 12/1928 | Agthe . |
| 2,550,726 | 5/1951 | Searle . |
| 2,955,042 | 10/1960 | Firor et al. . |
| 3,231,392 | 1/1966 | Sair . |
| 3,505,080 | 4/1970 | Cullen . |
| 3,812,269 | 5/1979 | Mueller et al. ............ 252/400 R X |
| 4,021,582 | 5/1977 | Hsu . |
| 4,200,542 | 4/1980 | Sedlak ........................ 252/400 R X |
| 4,282,260 | 8/1981 | Jadlocki, Jr. et al. . |
| 4,342,789 | 8/1982 | Ueno et al. ........................ 426/266 |

OTHER PUBLICATIONS

Hawley, *Condensed Chemical Dictionary*, 9th Ed., 1977, p. 509, Gp. 130.
Pensabene et al., "Effect of Tocopherol Formulations on the Inhibition of Nitrosopyrrolidine Formation in Model Systems", J. Fd. Sci. (1977), 426-266.
Fiddler et al., "Inhibition of Formation of Volatile Nitrosamines in Fried Bacon by the Use of Cure-Solubilized Tocopherol", J. Agric. Fd. Chem. 26(3), 1978, pp. 653-656, 426-266.
O'Brien, "USDA Acts on the Bacon Dilemma", *Food Product Development*, pp. 32-37, 7-1978, 426-266.
"Influence of Curing Ingredients and Storage Time on the Quality of Preblended Sausage Meats and Frankfurters" by Waldman, Westerberg and Simon in Journal of Food Service—vol. 39 (1974), pp. 718-722.
"Tocopherol, Carotene and Ascorbyl Palmitate" by Dr. H. Klaui in Flavours, Jul./Aug., 1976.
"Stability of Tocopherol in Bacon" by Mergens, Keating, Osadca, Araujo, De Ritter and Newmark, in Food Technology 32, Nov. 1978, pp. 40-44.
"Nitrite Update: Search Intensifies for Bacon Curing Alternatives" by Sheryl Ranieri, Oct. 1979 issue.
"Nitrosamines: Occurrence, Chemistry, Toxicity and Inhibition" by R. V. Smith, In Chemical Times & Trends, Jan. 1980 issue, pp. 35-42.
"International Symposium Reviews Ipact of Vitamin C on Iron Absorption, Nitrosation, Food Formulation Technologies" in Food Processing, Jul. 1981.
Technical Reference—Silica, vol. 18, p. 61-67.

*Primary Examiner*—Arthur L. Corbin
*Attorney, Agent, or Firm*—Harness, Dickey & Pierce

[57] ABSTRACT

A subtantially dry, free-flowing particulated mixture suitable for use in the "dry" and "wet" curing of meat products, such as bacon, and for suppression of N-nitrosamine formation during subsequent cooking of the cured meat products comprising a substantially uniform mixture of water soluble particulated meat curing constituents, water insoluble amorphous absorbent silica particles and a liquid alpha-tocopherol uniformly distributed on the water soluble particles and said silica particles. The mixture preferably further contains particulated lecithin, when it is to be employed for "wet" curing, to further enhance the stability of the aqueous brine solution produced by dissolving the free-flowing mixture in water, through which the alpha-tocopherol is uniformly dispersed, providing a pumpable liquid for injection into meat products. The free-flowing mixture can contain appropriate amounts of any one or mixtures of other ingredients of the types conventionally employed in the curing of meat products, such as salt, sugar, erythorbates, ascorbates, phosphate salts, nitrites, nitrates and the like.

14 Claims, No Drawings

METHOD OF FORMING A MEAT CURING BRINE

This is a division of application Ser. No. 358,629, filed Mar. 16, 1982, U.S. Pat. No. 4,434,187.

BACKGROUND OF THE INVENTION

It is a well-known practice to add sodium nitrite to meat products, particularly bacon, to improve the quality and taste and to further inhibit the growth of deadly botulinal toxin during storage of the meat prior to consumption. Approximately ten years ago, it was discovered that during the cooking of such nitrite-containing meat products, N-nitrosamines such a N-nitrosopyrrolidine (NPYR) and N-nitrosodimethylamine (NDMA) were formed as a result of chemical reactions between certain classes of amines comprising natural components of such foods and the nitrite additive used in the curing and preservation of the meat product. Such N-nitrosamines have now been shown to be carcinogens in animals and considerable work has been conducted to suppress or inhibit the formation of such N-nitrosamines during the cooking or frying stage of such meat products.

Recently, it has been discovered that dl-alpha-tocopherol (Vitamin E), when incorporated in such meat products prior to cooking is effective in suppressing the formation of N-nitrosamines. The dl-alpha-tocopherol employed is in the form of a water insoluble viscous liquid which has been employed in the so-called "dry curing" of meat products by direct application to the surface of the meat to which the meat curing additives are also added, such as the curing salt, nitrites, and other conventional curing additives. This method of dry curing meat products has the disadvantage of requiring lengthy time period of up to about two weeks to penetrate the meat product and the distribution of the cure and liquid tocopherol additive is less than uniform. For these reasons, over 90 percent of bacon is cured employing the so-called "wet curing" process in which a brine solution or "curing pickle" incorporating the curing additives and, experimentally, the alpha-tocopherol agent is injected at various locations into pork bellies employing tubular needles whereby a more rapid cure and more uniform distribution of the curing agent is attained.

A continuing problem associated with such wet curing or "pump" techniques is the difficulty of incorporating and maintaining the alpha-tocopherol in a curing pickle in a uniform dispersed condition due to its hydrophobic characteristics necessitating the use of relatively high concentrations of emulsifying agents. For example, 200 ppm of polysorbate 60 or 80 are required in the brine solution to retain pumpability thereof. Such high levels of synthetic emulsifying agents required and the tendency of such brine solutions to become unstable resulting in segregation and/or agglomeration of the alpha-tocopherol additive has detracted somewhat from the efficient use of such solutions.

A further problem associated with both the dry and wet curing systems has been the difficulty of providing an alpha-tocopherol containing curing material which is uniform and free flowing enabling uniform distribution of the material directly on the surface of the meat products to be cured or in the continuous feeding of such a mixture to a brine tank for replenishment of the brine solution as it is consumed.

The present invention overcomes many of the problems and disadvantages associated with prior art compositions and techniques by providing a substantially dry free-flowing particulate mixture which is stable in storage and can effectively be employed in both the dry curing and wet curing methods and which upon dissolution forms a brine solution in which the alpha-tocopherol is substantially uniformly distributed in the presence of only moderate agitation, assuring pumpability of the brine curing solution and uniform distribution of the additive ingredients therein throughout the meat product.

SUMMARY OF THE INVENTION

The benefits and advantages of the present invention are based on the discovery that substantially uniform free-flowing particulate curing compositions containing effective amounts of dl-alpha-tocopherol can be prepared suitable for use in dry curing of meat products and which are also suitable for forming a curing brine or curing pickle for use in the wet or pump cure method in which the alpha-tocopherol is substantially uniformly dispersed and remains stable by virtue of the incorporation of controlled amounts of water soluble finely particulated curing constituents in combination with finely particulated, aqueous insoluble, amorphous, absorbent, silica particles. The alpha-tocopherol constituent is released by the water soluble particles and silica particles upon dry surface application to the meat or is dispersed into brine upon dissolution of the particulated mixture into water, and said curing pickle is injected into the meat product attaining a substantially uniform distribution of the tocopherol constituent whereby a significant suppression in N-nitrosamine production is attained during the subsequent cooking or frying of the cured meat product. The specific quantity of water soluble particulated curing constituents, silica particles and alpha-tocopherol employed in the mixture is dictated to some extent by federal regulations regarding permissible levels of flow agents in free-flowing salt mixtures, the quantity of nitrite and/or nitrate salts employed in the curing mixture, the level of tocopherol permitted, the level of N-nitrosamine permissible, and the strength of the curing brine solution desired. Accordingly, in accordance with the composition aspects of the present invention, the mixture contains as its essential constituents controlled amounts of water soluble particulated curing constituents such as salt, sugar, phosphates, curing accelerators and the like; amorphous porous silica particles and dl-alpha-tocopherol. Optionally and preferably, the free-flowing particulated mixture may further contain a finely particulated lecithin to synergistically enhance the stability of the dispersion of the mixture following dissolution in water to form a curing brine.

In accordance with the process aspects of the present invention, the substantially dry, free-flowing mixture is prepared by applying to a finely particulated water soluble curing constituent or mixture of constituents, controlled at a temperature of about 100° to about 140° F., an appropriate amount of dl-alpha-tocopherol in liquid form and blending the two constituents until a uniform distribution of the tocopherol on the surfaces of the particles is attained. Thereafter, the finely particulated silica particles are added to the mixture with continued blending to form a substantially uniform mixture. In accordance with an optional practice, a controlled amount of a finely particulated lecithin is thereafter added at a temperature below the melting point of the lecithin additive followed by further blending to effect uniform distribution. When lecithin is employed as an optional but preferred addition agent, it can be added to the mixture prior to or after the addition of the silica particles. It is also contemplated that nitrite/nitrate salts can be blended into the mixture if they are encapsulated or if appropriate packaging safeguards are employed to avoid nitrite/nitrate decomposition or in the event the mixture is to be used shortly after preparation. Any of the remaining water soluble curing constituents such as salt, sugar, phosphate salts, erythorbates, ascorbates and the like can be added thereafter and blended to achieve uniformity of the mixture.

In accordance with a further method aspect of the present invention, the substantially dry free-flowing mixture can be applied directly to the surface of meat products along with other curing constituents, if not already incorporated in the mixture, to effect a dry curing thereof, or alternatively, can be dispersed in water or a brine solution to form an aqueous brine dispersion in which the alpha-tocopherol additive is substantially uniformly distributed and which is pumpable and can be injected by the wet curing method into such meat products. The free-flowing nature of the mixture enables use of automatic feeding equipment for effecting continuous replenishment of the brine curing tank during such wet curing operations.

Additional benefits and advantages of the present invention will become apparent upon a reading of the Description of the Preferred Embodiments considered in conjunction with the specific examples provided.

DESCRIPTION OF THE PREFERRED EMBODIMENTS

In accordance with the composition aspects of the present invention, the substantially dry, free-flowing particulated mixture contains controlled effective amounts of a water soluble particulated curing constituent or mixtures thereof, aqueous insoluble, amorphous, tocopherol absorbent, silica particles and dl-alpha-tocopherol substantially uniformly distributed on the water soluble particulated curing constituents and distributed on and absorbed in said silica particles.

The water soluble particulated meat curing constituents or mixture of constituents comprises materials selected from the group including sodium chloride, potassium chloride, mixtures of the foregoing as well as substances acceptable for use in the preparation and/or cure of meat products as specifically enumerated in 9CFR 318.7, the substance of which is also incorporated herein by reference including future additions and deletions thereof. Most common substances employed in the curing of meat products in addition to salt are phosphates and polyphosphates, sugars, ascorbates, erythorbates, alkali metal nitrites and/or nitrates, and the like. The most common water soluble particulated constituent is sodium chloride, potassium chloride and mixtures thereof. The particulated curing constituents are of a food grade as defined in "Food Chemicals Codex" Third Edition, 1981 by National Academy Press, Washington, D.C.

The specific configuration of the particles of water soluble curing constituents is not critical in attaining the benefits of the present invention. For example, sodium chloride can be granulated, dendritic, flake shape and the like. Particularly satisfactory results are obtained employing natural flake salt particles produced by the Alberger process. The average particle size of the water soluble curing constituents is generally controlled to less than about 500 microns with average particle size ranges of from about 100 to about 300 microns being preferred. The moisture content of the particulated curing constituents is preferably as low as possible with surface moisture contents of less than about 2 percent by weight, preferably 0.1 percent by weight or less being particularly satisfactory.

The dl-alpha-tocopherol additive agent is employed in the form of a viscous liquid comprising either a substantially pure dl-alpha-tocopherol or a commercial mixture containing other isomers in which the dl-alpha-tocopherol constitutes the major active constituent. The tocopherol additive can be employed in amounts up to about 5 percent by weight of the total mixture with amounts ranging from about 0.3 to about 4 percent being preferred and with amounts of from about 1.5 to about 3.5 percent being typical.

The finely particulated amorphous, porous and absorbent silica particles are of an average particle size ranging from about 0.5 up to about 9 microns, with average particle sizes of from about 1.5 to about 7 microns usually being preferred. While the concentration of the silica particles is usually dictated in consideration of the water-soluble curing constituents and the quantity of tocopherol additive employed, concentrations as high as about 3 percent by weight in the mixture can be employed. However, in view of current federal regulations dictating a maximum concentration of silica flow agents in dry particulated salt mixtures at a maximum level of 2 percent, the concentration of the silica particles is generally controlled at a level of 2 percent by weight to levels as low as about 1 percent by weight. When the powder mixture is to be employed for forming a pumpable brine solution for wet curing meat products, it is generally preferred to control the weight ratio of silica particles to tocopherol at a level of at least about 0.33 parts silica particles per part by weight tocopherol in order to attain a substantially free flowing dry mixture and in addition, a substantially stable dispersion of the alpha-tocopherol in an aqueous solution.

The particular concentration of the dl-alpha-tocopherol employed is also in part dictated by federal regulations and in further consideration of the nitrite/nitrate salts employed in the curing process and the desired level of suppression of N-nitrosamines desired in the cooked meat products. In accordance with current federal standards, concentrations of nitrosamines in cooked meat products of greater than 16 parts per billion (ppb) are cause for retention of product; 10–16 ppb are considered an actionable level for investigation and process evaluation; levels less than 10 ppb are acceptable for distribution and consumption, with no detectable nitrosamines being preferred. Tests conducted employing the present composition in the wet cure of pork bellies has evidenced a suppression of N-nitrosamines to a level of as low as about 2 ppb in cooked-out bacon. Federal regulations have also tentatively established a maximum concentration of dl-alpha-tocopherol based on the fresh weight of a pork belly at a maximum level of 500 ppm. This limitation in further combination with a further federal regulation that a maximum of about 10 percent weight increase in the original fresh meat product is permitted by the addition of water and curing additives dictates the use of a particulated mixture of the present invention containing an appropriate percent of alpha-tocopherol to attain about a 10 percent weight increase in the original fresh meat treated to provide a maximum of 500 ppm concentration of alpha-tocopherol on the basis of the fresh meat product.

For example, a particulated mixture incorporating sodium chloride as the water soluble particulated curing constituent in an amount to produce a 15 percent sodium chloride brine solution will contain about 3.33 percent of alpha-tocopherol, based on the salt weight, to attain a 10 percent weight increase of the fresh meat to provide a 500 ppm concentration of said alpha-tocopherol. Typically, curing brines or pickles are used ranging from about 10 to about 20 percent by weight sodium and/or potassium chloride with concentrations of about 12 to 18 percent being usual. At a brine concentration of about 10 percent salt, the alpha-tocopherol content in the dry particulated mixture would be about 4.33 percent while at a brine concentration of about 20 percent, the alpha-tocopherol content in the dry mixture would be about 2.17 percent to provide a 500 ppm tocopherol concentration in the pumped meat product.

Similarly, when the particulated curing agent is sodium chloride, the silica constituent, because of federal regulations, is controlled at a maximum level of 2 percent by weight of the sodium chloride. The dry particulated mixture, accordingly, contains typically 3.25 percent by weight alpha-tocopherol, 1.90 percent by weight of the finely particulated silica particles and 94.85 percent by weight of sodium chloride particles.

When the water soluble particulated curing constituent comprises substances other than sodium and/or potassium chloride, such as sugar, phosphates and polyphosphates, ascorbates, erythorborates, nitrites and/or nitrates as well as mixtures of the foregoing, then the silica particles can be present in an amount of up to about 1 percent to about 4 percent by weight with the alpha-tocopherol being present at a weight ratio of silica particles to tocopherol of at least about 0.33 part silica particles per part by weight tocopherol to attain a free-flowing substantially dry mixture and a substantially stable dispersion upon formation of the aqueous solution.

The aqueous insoluble, porous, amorphous, absorbent silica particles can comprise silica gel or hydrated silicon dioxide particles which serve the dual function of a flow agent for the dry powder mixture, facilitating uniform distribution of the tocopherol additive in a dry curing process, as well as for providing an unexpected improvement in the stability of the dispersion of the tocopherol when the dry powdered mixture is dissolved to form a brine solution for use in wet curing processes. Silica materials which are commercially available and have been found particularly satisfactory for this purpose include a silica gel sold under the brand name Syloid 244 available from W. R. Grace & Company; hydrated silicon dioxide particles sold under the brand designations Zeothix 265 and Zeofree 80 available from J. M. Huber Corporation.

The silica gel material is conventionally produced by the acidification of a soluble silicate solution producing a hydrosol which later forms a continuous silica hydrogel or a gelatinous precipitate depending on the concentration, degree of neutralization, and method of mixing. Usually, the final gel is obtained by washing the hydrogel to free it of electrolytes and drying to such an extent that the resulting gel is essentially free of water. The Syloid 244 material comprises a silica gel and is of an average particle size of 4 microns, a surface area of about 310 square meters per gram, an oil absorption of about 305 cubic centimeters per 100 grams, a bulk density of about 7 pounds per cubic foot and a pore diameter of about 150 Angstroms.

The hydrated silicon dioxide particles suitable for use in accordance with the present invention are also referred to as precipitated silicas which are formed by the destabilization of soluble silicates, usually by acid neutralization. The destabilization is carried out in a solution which also contains polymerization inhibitors, such as inorganic salts, which cause an extremely fine precipitate of hydrated silica to be formed. The precipitate is thereafter filtered, washed essentially free of occluded salts and thereafter dried to the desired degree. The Zeothix 265 material comprising a hydrated or precipitated silica is of an average particle size of about 1.5 to about 2 microns, a surface area of from about 200 to about 300 square meters per gram, an oil absorption of about 200 to about 240 cubic centimeters per 100 grams, and a bulk density of about 5 to about 7 pounds per cubic foot. The Zeofree 80 material has an average particle size of about 5 to about 7 microns, a surface area of about 120 to about 150 square meters per gram, an oil absorption of about 180 to about 200 cubic centimeters per 100 grams, and a bulk density of about 10 to about 12 pounds per cubic foot.

The aqueous insoluble silica particles suitable for use in the practice of the present invention are characterized as having an average particle size ranging from about 0.5 to about 9 microns, preferably about 1.5 to about 7 microns; a surface area of about 100 to about 500, preferably 120 to about 310 square meters per gram; an oil absorption of about 100 to about 350, preferably 180 to about 305 cubic centimeters per 100 grams; a bulk density of from about 3 to about 15, preferably about 5 to about 12 pounds per cubic foot, and an average pore diameter of about 20 to about 300 angstroms; preferably about 100 to about 200 Angstroms.

In addition to the foregoing essential constituents, the dry particulate mixture can optionally further contain up to about 10 percent by weight, and preferably from about 1 percent to about 4 percent by weight of a substantially purified or a finely particulated lecithin to synergistically assist in the dispersion of the alpha-tocopherol additive in the brine solution for wet curing processes. The quantity of the lecithin is employed in consideration of the concentration of the alpha-tocopherol present in relationship to the silica particles present and typically is employed in an amount to provide a weight ratio of lecithin to silica particles of about 6:1 to about 0.5:1, preferably about 3:1 to about 0.8:1. For cost considerations, commercial lecithin materials can be employed for this purpose containing at least 50 percent by weight of acetone-insoluble phosphatides, but preferably over 90 percent acetone-insoluble phosphatides are employed.

It is also contemplated that appropriate amounts of nitrite and/or nitrate salts can be incorporated in the mixture in proportions conventionally employed for the curing of meat products. When used, it is preferred that such nitrite and/or nitrate salts comprise encapsulated or stabilized materials which can be used in the mixture without deterioration. Suitable encapsulated or stabilized nitrite and/or nitrate salts are described in U.S. Pat. Nos. 2,145,417, 2,668,771 and 3,052,560 the teachings of which are incorporated herein by reference. In the event non-stabilized nitrite and/or nitrate materials are used in the mixture, it is usually necessary, if the curing mixture is not used shortly after preparation, to vacuum package the blended mixture and backfill the package with an inert gas such as nitrogen in order to prolong the stability and useful life of the mixture.

The preparation of the free-flowing particulated mixture is preferably performed by introducing a measured quantity of the water-soluble particulated curing constituents at a moderate temperature of about 100° to about 140° F. into a suitable mixing or blending apparatus such as a ribbon blender. Thereafter, during constant agitation, the alpha-tocopherol additive is added and further mixing is continued until the tocopherol is uniformly distributed as a film over substantially all of the surfaces of the particles. Thereafter the particulated silica flow agent is added during continued further mixing for a period of time to effect a uniform mixture of good flowability and a partial coating of the silica particles with the tocopherol additive. If the optional lecithin additive agent is to be employed, it is preferably introduced in the form of a dry powder and the mixture is controlled at a temperature preferably below the melting point of the lecithin constituent to avoid melting thereof and inhibiting the free flowing characteristics of the particulated mixture. After the further mixing of the lecithin constituent, the other optional curing additives are added and blended for an additional time to produce a substantially uniform blend.

Although the sodium nitrite constituent is usually excluded from the mixture for the reasons hereinabove set forth, when employed, it can be directly introduced during mixing when proper precautions are taken in the blending and packaging operation.

The dry particulated mixture containing all of the additives necessary for curing meat products or the mixture containing the essential and certain optional constituents in further combination with a supplemental mixture of the remaining constituents can be directly applied by sprinkling and rubbing to the surfaces of the meat product in accordance with the conventional dry curing process. Alternatively, the mixture can be dispersed in water to form a curing brine nominally containing about 12 to about 18 percent by weight sodium chloride, effecting a substantially uniform distribution of the alpha-tocopherol constituent and the silica flow agent in the form of a substantially stable dispersion, in further combination with appropriate quantities of the remaining curing agents for pumping into pork bellies and other meat products by needle injection to produce a weight increase of the meat product up to about 10 percent of its original weight and providing a maximum concentration of alpha-tocopherol of about 500 ppm.

In order to further illustrate the composition and process aspects of the present invention, the following examples are provided. It will be understood that the examples are provided for illustrative purposes and are not intended to be limiting of the scope of the present invention as herein described and as set forth in the subjoined claims.

EXAMPLE 1

A substantially dry, free-flowing particulated mixture is prepared containing 1000 grams of Alberger fine flake salt, 33.3 grams alpha-tocopherol, 66.6 grams of powdered lecithin and 20.0 grams of an amorphous porous silica powder. The Alberger fine flake salt is of a high purity, food grade sodium chloride of a mesh size ranging from 40 to 100 U.S. standard sieve series having a surface area of 64.5 square foot per pound and a bulk density of about 49 to 58 pounds per cubic foot. The alpha-tocopherol constituent is a product commercially available under the designation dl-alpha tocopherol available from Roche Chemical Division, Hoffmann-LaRoche, Inc., Belvidere, N.J. The lecithin additive comprises a commercially available product sold under the brand designation M-C-THIN PUR available from Food Ingredients, Inc. of Elk Grove Village, Ill. The silica flow agent constituent comprises a material as previously described sold under the brand designation Syloid 244 available from W. R. Grace & Company.

A uniform mixture of the constituents is prepared by introducing the sodium chloride fine flake salt into a ribbon blender at a moderate temperature of about 120° F. and to which the alpha-tocopherol is added during continued further mixing for a period of two minutes. Thereafter, the silica additive flow agent is added during continued further mixing for a five minute period. The finely powdered lecithin additive is thereafter added during further mixing of one minute with the salt mixture at a temperature of less than about 120° F.

The resultant mixture is substantially dry and free flowing with the constituents uniformly distributed therethrough.

EXAMPLE 2

A substantially dry free-flowing powder mixture is prepared containing 1,000 grams fine flake salt, 33.3 grams alpha-tocopherol, 36.7 grams sodium ascorbate, 553.3 grams fine cane sugar, 233.3 grams sodium tripolyphosphate, 33.3 grams lecithin and 20 grams of the silica flow agent.

The sodium chloride salt, alpha-tocopherol, lecithin and silica additive agents are the same as those employed in Example 1.

The uniform mixture is prepared by the addition of sodium chloride salt at a temperature of about 120° F. to a ribbon blender and to which the alpha-tocopherol is added during continued further mixing for a period of two minutes. The silica flow agent is thereafter added followed by further mixing for a period of four minutes whereafter the lecithin powder is added following an additional one minute mix. At the completion of the preliminary blending, the sodium ascorbate, sugar and sodium tripolyphosphate are added with continued further blending for a period of two minutes producing a seemingly free-flowing powder mixture suitable for both dry and wet curing of meat products when combined with 8.33 grams sodium nitrite at the time of use.

EXAMPLE 3

A substantially dry free-flowing powder mixture is prepared containing 553.3 grams sugar, 233.3 grams sodium tripolyphosphate, 36.7 grams sodium erythorbate, 33.3 grams alpha-tocopherol, 20 grams of the silica flow agent and 24.7 grams lecithin.

The alpha-tocopherol, lecithin and silica additive agents are the same as those employed in Example 1. The sugar constituent is a product commercially available under the designation "Pure Fine Granulated Sugar" available from the Michigan Sugar Company. The sodium tripolyphosphate additive comprises a commercially available product sold under the designation "Nutrifos, Light Density, Granular" available from Monsanto Company. The sodium erythorbate constituent is commercially available under the designation "Sodium Erythorbate, Granular" available from Pfizer, Inc.

The uniform mixture is prepared by the addition of the sugar, sodium tripolyphosphate and sodium erythorbate to a ribbon blender in which the mixture is heated to a moderate temperature of about 100° F. during mixing. Thereafter, the tocopherol liquid additive is added during continued further mixing and is blended for a period of two minutes. The silica flow agent is thereafter added followed by further mixing for a period of four minutes whereafter the lecithin powder is added followed by an additional one minute mixing. This procedure produces a seemingly dry free-flowing powder mixture of about 901 grams suitable for use as an ingredient for both dry and wet curing of meat products.

When used for meat curing this dry free-flowing powder totaling 901 grams may typically be combined with 1000 grams of salt and 8.3 grams of sodium nitrite and applied as a dry mixture on the exterior of meat. The mixture also disperses well in an aqueous media comprising 5,666 grams water when 1000 grams of sodium chloride salt and 8.3 grams of sodium nitrite are added to the same aqueous media containing 901 grams of the mixture dispersed therein. The resulting dispersion is suitable for pumping in the wet meat curing process.

EXAMPLES 4 THROUGH 7

Substantially dry free-flowing powdered mixtures were prepared for aqueous incorporation in accordance with the formulation of ingredients shown in Table 1, entitled "Composition of Curing Pickles for Bacon Processing".

Example 4 is a control to which no silica particulates, dl-alpha-tocopherol or lecithin were added. Sugar, salt, sodium tripolyphosphate, sodium ascorbate and sodium nitrite were dissolved in water.

In Example 5, a substantially dry free-flowing powdered mixture was prepared containing 15 parts salt, 0.3 parts silicon dioxide and 0.5 parts dl-alpha-tocopherol in the following manner. The sodium chloride fine flake salt is introduced into a ribbon blender at about 120° F. and to which the dl-alpha-tocopherol is added during continued further mixing for a period of two minutes. Thereafter, the silica additive was added during continued further mixing for five minutes. To 71.725 parts of water were added and dissolved, 3.5 parts sodium tripolyphosphate, 0.55 parts sodium ascorbate and 0.125 parts sodium nitrite. To this composition was added 15.8 parts of the powdered mixture containing salt, tocopherol and silicon dioxide. With mild agitation, a dispersion of good stability of dl-alpha-tocopherol was formed in the brine.

In Example 6, a substantially dry, free-flowing powdered mixture is prepared with 15 parts salt, 0.3 parts silicon dioxide, 0.5 parts dl-alpha-tocopherol and 1.0 parts lecithin. The mixture was prepared as in accordance with Example 5 except that the finely powdered lecithin additive was added last with further mixing of one minute, with the mixture at a temperature of less than about 120° F. To 70.725 parts of water were added and dissolved, 8.3 parts of sugar, 3.5 parts of sodium tripolyphosphate, 0.55 parts sodium ascorbate and 0.25 parts sodium nitrite. To this composition was added 16.8 parts of the mixture of salt, silicon dioxide, dl-alpha-tocopherol and lecithin. With mild agitation, a dispersion of excellent stability of dl-alpha-tocopherol was formed in the brine.

In Example 7, a substantially dry, free-flowing powdered mixture is prepared by introducing 15 parts salt into a ribbon blender at about 120° F. and to which 0.5 parts dl-alpha-tocopherol is added during continued further mixing for a period of two minutes. Thereafter the silica additive is added during continued further mixing for a five minute period. The finely powdered lecithin additive is thereafter added during further mixing of one minute with the mixture at a temperature of less than about 120° F. The resultant mixture is substantially dry and free-flowing with the constituents uniformly distributed. To this mixture was further added 8.3 parts of sugar, 3.5 parts sodium tripolyphosphate, 0.55 parts sodium ascorbate and the mixture blended to result in a substantially dry and free-flowing mixture with the constituents uniformly distributed. To 70.725 parts of water was added 29.15 parts of the above mixture. With mild agitation an excellent dispersion of dl-alpha-tocopherol was formed in the aqueous solution. Following this addition and establishment of a dl-alpha-tocopherol dispersion, 0.125 parts of sodium nitrite was added to the aqueous solution and dissolved. The constituents employed in preparing Examples 4 through 7 are the same as described in Example 3. The sodium ascorbate ingredient was obtained from Pfizer, Inc.

The resultant curing pickles of Examples 4 through 7 were utilized for bacon processing in the following manner:

Fresh pork bellies were purchased soon after slaughter and stored for no more than two days in a cooler at 2° C. The bellies were processed with curing pickles according to the example treatments described in Table 1, using five randomly selected bellies for each treatment example. The bellies were pumped to 110 percent of original weight with the example treatments shown in Table 1. The pumped pork bellies were equilibrated, after pumping, for 24 hours at 4° C. At the end of the curing period, the bellies were transferred to an Elek-Trol laboratory smokehouse (Drying Systems, Inc., Chicago, Ill.) and smoke cooked at a temperature of 58° C. (dry bulb) for four hours, followed by three further hours of smoking at 52° C. (dry bulb) and ambient relative humidity. Smoke was applied through cooking using a midget size Mepaco smoke generator (Meat Packers Equipment Company, Oakland, Calif.) utilizing mixed hardwood sawdust. The smoked bellies were transferred to a tempering cooler (−2° C.) where they were held overnight prior to slicing and packaging.

The five bellies per example treatment were sliced to approximately 20–25 slices per pound or about ⅛ inch thickness and packaged in a manner similar to that found in retail packages. After each belly was sliced, it was packaged in 20 packages with the first slice going into the first package, the second slice into the second package, the third slice into the third package and so on until the belly was completely packaged. Thus, each of the 20 packages could be considered representative of an entire belly. Three packages randomly selected from each belly were analyzed for nitrosamines, while the remaining packages were used for other determinations.

The effect of the treatments on N-nitrosamine inhibition are shown in Table 2. Example 5 was considered not an ideal formulation in that a slight surface film of tocopherol appeared after solution of the curing mix. However, it was not a gross phase break of the dispersion and the majority of tocopherol remained dispersed. Example treatments 6 and 7 provided ideal dispersion of tocopherol with no detectable phase break of tocopherol in the curing pickle. There were no significant differences in the inhibition of N-nitrosamines in either the fried bacon or the cooked-out fat between the example treatments 5, 6 and 7. In all cases, about 90 percent N-nitrosamine inhibition in fried bacon was attained for N-nitropyrrolidine (NPYR) and about 80 percent for N-nitrosodimethylamine (NDMA) in comparison to the control treatment of Example 4.

TABLE 1

COMPOSITION OF CURING PICKLES FOR BACON PROCESSING, % BY WEIGHT

| INGREDIENTS | EXAMPLE NO. | | | |
|---|---|---|---|---|
| | 4 | 5 | 6 | 7 |
| Water | 72.525 | 71.725 | 70.725 | 70.725 |
| Salt | 15.0 | 15.0 | 15.0 | 15.0 |
| Sugar | 8.30 | 8.30 | 8.30 | 8.30 |
| Sodium Tripolyphosphate | 3.50 | 3.50 | 3.50 | 3.50 |
| Sodium Ascorbate | 0.550 | 0.550 | 0.550 | 0.550 |
| Sodium Nitrite | 0.125 | 0.125 | 0.125 | 0.125 |
| Silicon Dioxide | — | 0.30 | 0.30 | 0.30 |
| dl-alpha-tocopherol | — | 0.50 | 0.50 | 0.50 |
| Lecithin | — | — | 1.00 | 1.00 | distribution of the cure throughout the bellies. At the end of the curing period, the bellies were transferred to an Elek-Trol laboratory smokehouse (Drying Systems, Inc., Chicago, Ill.) and smoke-cooked at a temperature of 58° C. (dry bulb) for four hours followed by three further hours of smoking at 52° C. (dry bulb) and ambient relative humidity. Smoke was applied throughout cooking using a midget size Mepaco smoke generator (Meat Packers Equipment Company, Oakland, Calif.) utilizing mixed hardwood sawdust. The smoked bellies were transferred to a tempering cooler (−2° C.) where they were held overnight prior to slicing and packaging.

The six bellies per treatment were sliced 20–25 slices per pound or about ⅛th inch thickness and packaged in a manner similar to retail packages. After each belly was sliced, it was packaged in 20 packages with the first slice going into the first package, the second slice into the second package, the third slice into the third package and so on, until the belly was completely packaged. Thus, each of the 20 packages could be representative of an entire belly. Six packages randomly selected from each belly were analyzed for nitrosamines, while the remaining packages were used for other determinations.

TABLE 2

N—NITROSAMINE LEVELS AND PERCENT INHIBITION OF N—NITROSAMINE FORMATION IN BRINE-CURED BACON AND COOK-OUT FAT[a]

| EXAMPLE No. | Fried-Bacon | | Cook-Out Fat | | Fried-Bacon | | Cook-Out Fat | |
|---|---|---|---|---|---|---|---|---|
| | NPYR µg/kg | Inhibition % | NPYR µg/kg | Inhibition % | NDMA µg/kg | Inhibition % | NDMA µg/kg | Inhibition % |
| 4 | 19.5 (14–27)[b] | — | 18.0 (13–28) | — | 5.5 (4–6) | — | 4.7 (3–6) | — |
| 5 | 1.8 (1.1–2.9) | 91 | Trace | 97 | 1.1 (ND–2.0) | 80 | 2.5 (1.9–3.4) | 46 |
| 6 | 2.5 (1.4–4.2) | 87 | Trace | 97 | 1.3 (1.0–2.2) | 76 | 2.5 (1.1–3.2) | 46 |
| 7 | 1.9 (1.6–2.5) | 90 | ND[c] | 100 | 0.4 (ND–1.2) | 92 | 2.0 (1.6–2.8) | 57 |

[a]Each value represents the average of three analyses of five bellies per treatment.
[b]Values in parentheses represent range of N—nitrosamines levels obtained per treatment.
[c]ND, not detected; limit of detection, 0.1 µg/kg. (microgram/kilogram).

EXAMPLE 8

A substantially dry free-flowing powder mixture is prepared containing 1,000 grams fine flake salt, 20 grams dl-alpha-tocopherol, and 20 grams of the silica flow agent; said agents are the same as those employed in Example 1. The uniform mixture is prepared by the addition of sodium chloride salt at the temperature of about 120° F. to a ribbon blender into which the alpha-tocopherol is added during continued further mixing for a period of two minutes. The silica flow agent is thereafter added followed by further mixing for a period of about four minutes. To 2.6 lbs. of this mixture were added, 0.83 lbs. sugar, 0.055 lbs. sodium ascorbate and 0.012 lbs. sodium nitrite. This combination was then further thoroughly mixed by hand to achieve a final composition for utilization in a dry curing bacon application.

Pork bellies were purchased soon after slaughter and stored for no more than two days in a cooler at 2° C. This mixture was applied to the pork bellies to achieve, on a pork belly fresh weight basis, the addition of 2.5 percent salt, 0.83 percent sugar, 0.055 percent sodium ascorbate, 0.012 percent sodium nitrite and 0.050 percent tocopherol. The mixture was rubbed into the bellies and the bellies were placed in plastic bags (three bellies per bag) and held in the curing room at 2° C. The bellies were inverted after five days to allow for good In addition to this treatment, a similar treatment was conducted with a similar formula composition, except that tocopherol was not included. This control treatment resulted in 42 micrograms per kilogram of NPYR in the fried bacon. The treatment containing tocopherol resulted in 1.5 micrograms per kilogram of NPYR, thus resulting in a 96 percent inhibition of nitrosamine formation through the use of the mixture containing tocopherol.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of forming a substantially stable aqueous curing brine suitable for wet curing or pumping of meat products in which a controlled amount of dl-alpha-tocopherol is substantially uniformly dispersed therethrough comprising the steps of dissolving and dispersing in an aqueous medium a substantially uniform free-flowing particulated composition consisting essentially of controlled amounts of at least one water soluble finely particulated curing constituent, finely particulated water insoluble amorphous, tocopherol absorbent porous silica particles and dl-alpha-tocopherol distributed substantially uniformly on the particles of said curing constituent and distributed on and absorbed in said silica particles.

2. The method as defined in claim 1 in which said composition further contains particulated lecithin in an amount up to about 10 percent by weight.

3. The method as defined in claim 1 in which said curing constituent includes particles selected from the group consisting of sodium chloride, potassium chloride, sugar, phosphate salts, erythorbates, ascorbates, nitrites, nitrates and mixtures thereof.

4. The method as defined in claim 1 in which said particulated curing constituent is selected from the group consisting of sodium chloride, potassium chloride and mixtures thereof.

5. The method as defined in claim 1 in which the average particle size of said particulated curing constituent is less than about 500 microns.

6. The method as defined in claim 1 in which the average particle size of said silica particles ranges from about 0.5 to about 9 microns.

7. The method as defined in claim 1 in which said dl-alpha-tocopherol is present in an amount up to about 5 percent by weight of said composition.

8. The method as defined in claim 1 in which said silica particles are present in an amount of at least about 0.33 part by weight per part by weight of said dl-alpha-tocopherol.

9. The method as defined in claim 1 in which said composition further contains particulated lecithin in an amount of about 1 to about 4 percent by weight of said composition.

10. The method as defined in claim 1 in which the average particle size of said curing constituent ranges from about 100 to about 300 microns.

11. The method as defined in claim 1 in which the average particle size of said silica particles ranges from about 1.5 to about 7 microns.

12. The method as defined in claim 1 in which said silica particles are of an average particle size ranging from about 0.5 to about 9 microns, said silica particles have a surface area of about 100 to about 500 square meters per gram, said silica particles have an oil absorption of about 100 to about 350 cubic centimeters per 100 grams and said silica particles have an average pore diameter of about 20 to about 300 Angstroms.

13. The method as defined in claim 1 in which said curing constituent comprises sodium chloride, potassium chloride or mixtures thereof present in an amount of about 94.85 percent by weight of said composition; said dl-alpha-tocopherol is present in an amount of about 3.25 percent by weight, and said silica particles are present in an amount of about 1.9 percent by weight of said composition.

14. The method as defined in claim 13 in which said composition further includes particulated lecithin present in a weight ratio of lecithin to said silica particles in an amount of about 6:1 to about 0.5:1.

* * * * *